Feb. 23, 1954 B. E. DEL MAR 2,669,921
CABIN PRESSURE REGULATOR
Filed Feb. 14, 1951 2 Sheets-Sheet 1

INVENTOR.
BRUCE E. DEL MAR
BY
J Edwin Coates
ATTORNEY

Feb. 23, 1954  B. E. DEL MAR  2,669,921
CABIN PRESSURE REGULATOR
Filed Feb. 14, 1951  2 Sheets-Sheet 2

INVENTOR.
BRUCE E. DEL MAR
BY
Edwin Coates
-ATTORNEY-

Patented Feb. 23, 1954

2,669,921

UNITED STATES PATENT OFFICE 2,669,921

CABIN PRESSURE REGULATOR

Bruce E. Del Mar, Los Angeles, Calif., assignor to Douglas Aircraft Company, Inc., Santa Monica, Calif.

Application February 14, 1951, Serial No. 210,945

6 Claims. (Cl. 98—1.5)

This invention relates to pressure regulating instruments and more particularly to such instruments especially useful in systems for controlling pressure of the air of pressurizable aircraft cabins.

This application discloses instruments of the one type disclosed in my copending application Serial No. 669,366, now U. S. Patent No. 2,549,673. In the pressure regulating system therein shown, as in all such systems, the absolute pressure of cabin air is varied by controllably varying the rate of air discharge from the cabin relative to the rate of air delivery to the cabin. The air delivered to the cabin is furnished by superchargers or like blowers which are capable of delivering air to the cabin at pressures greater than ambient or flight pressure. The rate of air discharge is varied by valve means controlling a discharge opening formed in the cabin wall.

Considerable development has been undertaken in the past toward providing means to control the pressure in aircraft cabins along certain predetermined schedules. Initial efforts were directed toward maintaining cabin absolute pressure constant at an intermediate altitude whenever flight above that altitude was attempted. Control of cabin pressure at the constant value of an intermediate altitude has been found impractical since it is obvious that little had been achieved in isolating the passengers of the cabin from the rather rapid changes in pressure during the ascents and descents in a region where the air is most dense and where the pressure thereof changes most rapidly with changes in altitude.

Control means have also been previously proposed which controlled cabin pressure in some predetermined relation to the change in pressure of the flight atmosphere so that cabin absolute pressure was varied in proportion to changes in flight pressure. These prior systems, although an improvement over the constant altitude pressure schedules, did not provide the most comfortable pressure change for the passengers as cabin pressure during ascent and descent still changed more rapidly at the lower altitudes than at higher altitudes.

The control instrument of the present invention in all embodiments illustrated obviates the difficulties had with previous proposed control instruments by providing means for controlling the absolute pressure within the cabin as a straight line function of the altitude of the aircraft, that is, altitude used in the standard aeronautical sense as meaning altitude based on absolute pressure in the standard international atmosphere. Where the term altitude is used herein it is intended to means pressure altitude in the sense just described.

The cabin pressure control effected by the control instrument of the present invention produces the slowest and, therefore, the most comfortable pressure change rate for the cabin passengers during descents and ascents generally encountered in normal commercial aircraft operations. This is true because the factor in controlling the change of cabin absolute pressure during either ascent or descent of the aircraft is the change of altitude of the aircraft.

Since commercial aircraft have so-called placard or limit speeds, descents cannot be made faster than the rate which will produce the limit speed and it is conventional airline practice to descend in accordance with equal increments of altitude per unit of time. Similarly on the ascent the relatively constant available power from modern supercharged aircraft engines within the normal flight range makes it reasonable to use the excess power over that needed in overcoming level flight gravitational lift and drag forces to increase the aircraft altitude in equal increments per unit of time.

Thus the typical scheduled commercial aircraft climb or descent is one of constant flight speed and constant rate of altitude change. Since passenger comfort in the cabin may be measured in terms of pressure change rates, it is clearly most desirable to control the absolute pressure within the cabin as a straight line function of the altitude change of the aircraft.

In all embodiments of the instrument of the present invention a pair of pressure change responsive means, one subject to cabin absolute pressure and the other subject to changes in cabin differential pressure, coact together by so varying the rate of air discharge from the cabin relative to the rate of air delivery to the cabin as to cause cabin absolute pressure to change as a straight line function of the change of altitude of the aircraft. The cabin differential pressure means acts through a mechanism which opposes the action of the cabin absolute pressure sensitive means on the means varying the rate of air discharge from the cabin. This mechanism is so arranged that the inclemental effect of such opposition progressively increases as the pressure altitude increases to so actuate the means controllably varying the rate of air discharge as to decrease the cabin absolute pressure in inverse straight line proportions to increase in pressure altitude of the aircraft.

Other features and advantages of the present invention will be hereinafter apparent from the following description, particularly when taken in connection with the accompanying drawing, in which.

Figure 1:
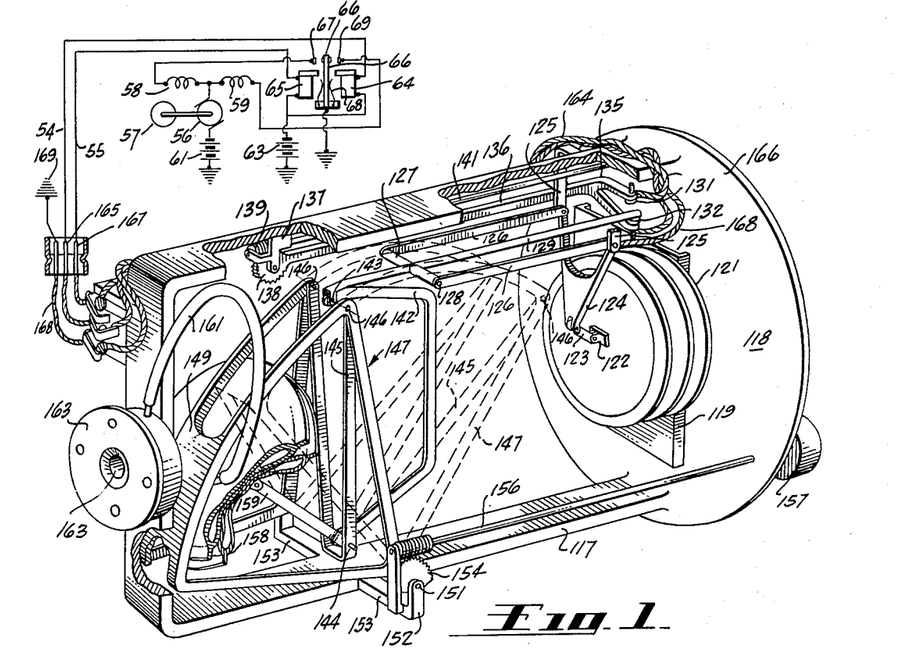
Figure 1 is a perspective view of one form of the instrument with the case thereof removed to more clearly illustrate the mechanism thereof and showing one form of a control circuit with which it can be used.

The embodiment of the instrument of the present invention illustrated in Figure 1 comprises a housing or case, which for illustrative purposes, has not been shown to more fully illustrate the mechanism forming the operating parts of the instrument.

The instrument includes a frame 117 formed at one end thereof with an integral wall element 118 which closes the open end of the case when the frame is mounted thereinto. Fixed to the inner surface of the wall element 11 is a bracket member 119 for mounting one end of an aneroid capsule assembly 121. The opposite end of the capsule assembly carries a lug 122 for pivotally mounting one end of a link 123. The opposite end of the link 123 is pivotally connected to the free end of an arm 124 of a bell crank lever pivotally mounted to arms 125 carried at opposite sides of the frame member 117 and suitably insulated therefrom.

The arm 124 of the bell crank lever is formed as a triangular plate having a portion of the base thereof cut away to lighten the same. The other arm of the bell crank lever actually comprises two arms 126 angularly extending from the opposite portions of the base of the triangular shaped arm 124. The outer or free ends of the arms 126 are interconnected and held in spaced relationship by a cylindrical rod 127 carrying at its opposite ends pivot pins 128 mounted in aligned apertures formed in the free ends of the arms 126. The cylindrical rod 127 fixedly carries a control arm 129, the one end of which is movable between and into engagement with a pair of spaced contacts 131 and 132.

The contacts are insulatedly carried by lead screws 133 and 134 threadedly mounted in a bifurcated element 135 carried at the one end of an elongate rod 136 the opposite end of which is pivotally mounted to a bracket 137 depending from the upper portion of the frame 117. The end of the arm 136 pivotally mounted to the bracket 137 carries a sector gear 138 meshing with the worm gear 139 coaxially mounted to a rotatably mounted rod 141. The opposite end of the rod 141 pierces the wall element 118 and carries at its free end an actuating knob, not shown, but used to rotatably drive the rod 141.

It should be seen now that rotation of the rod 141 through the worm gear 139 and sector gear 138 will pivotally move the rod 136 about the axis established by its pivotal connection to the bracket 137. Pivotal movement of the rod 136 results in vertical movement of the bifurcated element 135 to conjointly adjust the position of the contacts 131 and 132 relative to the control arm 129. The control arm 129 is pivotally connected at the end opposite to the end portion engageable with the contacts to a U-shaped link 142 by a pivot pin 143. The opposite end of the U-shaped link 142 is fixed to an elongate pivot pin 144, the opposite ends of which are pivotally mounted in aligned apertures in a yoke 145 adjacent the bow or transverse element of the yoke. The free ends of the arms of the yoke 145 are pivotally connected by pins 146 to a support element 147. The support element 147 comprises two triangular shaped rigid frame members 148 fixedly inter-connected in parallelism by a web element 149. The support element formed by the frame members 148 is pivotally mounted by pivot pins 151 to fingers 152 upstanding from oppositely extending lateral arms 153 of the frame member 117.

Rigidly carried by the one frame element 148 is a sector gear 154 meshing with a worm gear 155 coaxially carried by a rod 156 rotatably supported in the wall element 118 and projecting beyond the latter to terminate on the exterior of the instrument case. This end of the rod 156 carries an actuating knob 157 for rotatably driving the rod 156 which in turn, through the gears 155 and 154, angularly adjust the position of the support 147 from the solid line position shown in Figure 1 to the dotted line position of that figure. The purpose of this adjustment will be hereinafter more fully explained. A capsule assembly 158, similar to capsule assembly 13, has one end thereof rigidly fixed to the web element 149 of the support 147 while the opposite end is pivotally interconnected by a link 159 with the elongate pivot pin 144 carried by the yoke 145. The interior of the case of the instrument is intended to be subject to cabin absolute pressure so that the exterior of the capsule assembly 158 is exposed to that pressure. The interior of the capsule assembly 158 is to be connected to flight absolute pressure through a flexible conduit 161 leading to a hollow fitting 162 carried by the frame member 117 and presenting an opening 163 for receiving an end of a tube or conduit, not shown, but leading to flight absolute pressure. The capsule assembly 158 is subjected to cabin absolute pressure and flight absolute pressure and will respond to the difference between these pressures. The capsule assembly 158 is, therefore, a cabin differential pressure sensitive means.

The embodiment of the instrument now being described is intended to be used in a control circuit such as diagrammatically shown in Figure 1. Contact 131 is connected through a conductor 164 to a contact element 165 forming a part of a receptacle member carried by the frame 117 and adapted to receive an attachment cap to which lead 54 of the control circuit, diagrammatically shown, forms a part. Contact 132 is connected by a conductor 166 to contact member 167 adapted to be electrically connected to conductor 55 of the control circuit. A conductor lead 168 is connected to the bell crank lever to ground the control arm 129 as indicated at 169 so that this arm forms means for effecting a control of the circuit.

In this circuit, a motor 56, through a suitable gear train, not shown, operates a valve 57 used to control the rate of air discharge from the cabin in which the instrument is mounted. The motor 56 is reversible and may be energized either through the field coil 58 and 59 by power from some suitable source such as a battery 61 to move the valve in alternate directions depending upon the direction of rotation of the motor 56.

Automatic control of the valve 57 is effected through a control relay 62 which, as shown for illustrative purposes, is essentially a power amplifier in which very small currents from a battery 63 can be used to selectively energize the coils 64 and 65 of the relay 62 to control a flow of relatively large current in the circuits of the motor field coils 58 and 59. Energization of relay coil 65 causes the armature 66 of the relay 62 to move to the left, as viewed in Figure 1, and into engagement with a contact 67 against the action of one of a pair of centering springs 68 to complete a circuit from the battery 61 through the circuit of the field coil 58.

Energization of this field coil produces such rotation of the motor 56 to drive the valve 57 toward closing position to decrease the rate of air discharge from the cabin. Energization of relay coil 64 causes the armature 66 of the relay to move to the right, as viewed in Figure 1, to engage with contact 69 against the action of the other of the pair of centering springs 68 to complete a circuit from the battery 61 through the field coil 59. The completion of this circuit, as should now be understood, causes the motor 56 to drive the valve 57 in the opposite direction, that is, towards open position to increase the rate of air discharge from the cabin.

As the conductor 55 interconnects through conductor 166, contact 131 and the relay coil 64, movement of the control arm 129 into engagement with the contact 131 will result in closing movement of the valve 57. On the other hand movement of the control arm 129 into engagement with the contact 132 will result in energization of the circuit of the relay coil 64 which includes conductors 164 and 54 to produce opening movement of the valve 57.

To explain the operation of the embodiment of the instrument now being described, it will be seen that as the aneroid capsule assembly 121 expands as the aircraft ascends, because of lessening cabin absolute pressure, the bell crank lever will be moved in a clockwise direction to move the control arm 129 in a counterclockwise direction and into engagement with contact 131 to energize relay coil 65 which, as previously explained, will result in closing movement of the valve 57. It will thus be seen that the aneroid capsule assembly 121 at some altitude will tend to close the valve 57 and attempt to maintain cabin absolute pressure at a constant value as the aircraft ascends beyond that altitude. If the aneroid capsule assembly 121 was the only motivating element operatively connected to the control arm 129, the instrument now being described would merely maintain cabin absolute pressure at some constant value as the aircraft was flown at altitudes in excess of that altitude.

This is so, for it will be seen that as the valve 57 moved toward closing position, cabin absolute pressure would increase resulting in contraction of the aneroid capsule assembly 121. Contraction of the aneroid capsule assembly 121 will result, as should now be understood, in counter-clockwise movement of the bell crank lever and consequently clockwise movement of the control arm 129 to move the latter into engagement with the contact 132. Engagement between the control arm 129 and contact 132 would, as should now be understood, result in energization of the relay coil 64 to produce opening movement of the valve to lessen cabin absolute pressure. It will be seen that the aneroid capsule assembly will, therefore, tend to hold cabin absolute pressure substantially constant at some pressure value dependent, in part, on the position of the capsule assembly on the mounting bracket 119.

The differential pressure capsule assembly 158 also effects the position of the control arm 129 and in the embodiment of the invention now being described, as in the form of the instrument 56 of my patent above identified, mechanism is provided for not only controllably varying the control action of the differential pressure capsule assembly 158 on the control arm 129, but to also obviate any control action by the differential pressure capsule assembly as the same expands or contracts.

It will be seen that so long as the support 147 is in the position illustrated in solid lines in Figure 1, the axes of the pins 143 and 146 are coincident as are also the axes of the pins 151 and 144. The U-shaped link 142 is of such a length relative to the length of the yoke 145 that with the pins aligned, as above described, expansion and contraction of the differential pressure capsule 158, although resulting in pivotal movement of the yoke 145 and U-shaped link 142, will not transmit movement to the control arm 129. This is so for both the yoke and the U-shaped link 142 will pivot about a common axis established by the axes of the pins 146 and 143. With the support 147 in the position shown in solid lines in Figure 1, the control arm 129 is substantially locked against movement regardless of changing cabin differential pressure and is subject only to the control action of the aneroid capsule assembly 121.

If the support 147 is moved to the dotted line position shown in Figure 1, the lower end of the yoke 145 remains in substantially the position shown in solid lines, while the free ends of the arms thereof pivotally move into the position shown in broken lines. This movement of the support 147 does not in any way effect the position of the U-shaped line 142, which in all positions of adjustment of the support 147 remains in the position shown in Figure 1.

With the support 147 and the yoke 145 now moved to the position shown in broken lines in Figure 1, it will be seen that expansion and contraction of the differential pressure capsule assembly 158 will, through the link 159, arcuately move the yoke 145 about the axis established by the pins 146 which are now no longer aligned or coincident with the axis of the pin 143. The capsule assembly 121, in expanding as the aircraft ascended, would result in an elevation of cabin absolute pressure over flight ambient pressure to produce an increasing cabin differential pressure. This brings about contraction of the capsule assembly 158 and the link 159 applies a thrust to the left against the yoke 145 to arcuately move the yoke in a clockwise direction about the axes of the pins 146, resulting in clockwise movement of the U-shaped link 142 about the axis of the pin 143. This movement of the link 142 applies an upward thrust to the leftward end of the control arm 129 to move the control arm in a clockwise direction about the axes of the pins 128 to move the control arm into engagement with the contact 132 which, it will be remembered, results in opening movement of the valve 57 and consequently a decrease in cabin absolute pressure.

On the other hand, if the cabin differential pressure capsule assembly 158 should expand because of decreasing cabin differential pressure, the link 159 will urge the yoke 145 in a counterclockwise direction about the axes of the pins 146 resulting in counter-clockwise movement of the U-shaped link 142 about the axis of the pin 143. This movement of the link 142 applies a downward force to the leftward end of the control arm 129 to move the control arm in a counterclockwise direction about the axes of the pins 128 to move the control arm 129 into engagement with the contact 131 which, it will be remembered, brings about closing movement of the valve 57 and consequently an increase in cabin absolute pressure.

It will thus be seen that the differential pressure capsule assembly 158 opposes the action of the aneroid capsule assembly on the control arm 129. The ratio mechanism formed by the U-shaped link 142, yoke 145, support element 147 and associated connector elements is so arranged that the incremental affect of the opposition of the differential pressure capsule 158 progressively increases as the pressure altitude of the aircraft increases.

The resultant control action on the control arm 129, because of the coaction between the interconnected capsule assemblies 158 and 121, brings about such movement of the control arm into and out of engagement with the contacts 131 and 132 that cabin absolute pressure is controlled as a straight line function of the pressure altitude of the aircraft. Cabin absolute pressure is, therefore, actually controlled to decrease in inverse straight line proportions to increase in pressure altitude of the aircraft.

Figure 2:
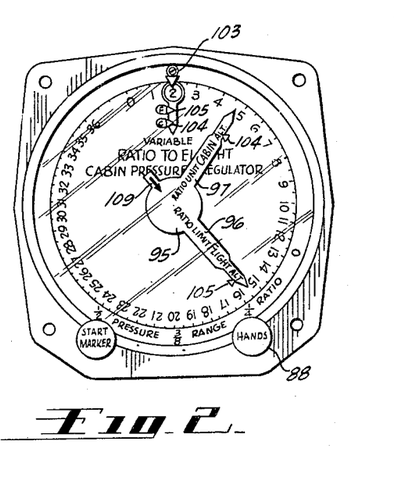
Figure 2 is an elevational view of one form of a dial face to be used with the instrument of the present invention.

The instrument as shown in Figure 1 may be provided with a dial and hand arrangement such as shown in Figure 5 of my Patent No. 2,549,673 which figure has been reproduced here as Figure 2. To simplify the illustration of this embodiment of the invention the gear trains interconnecting the rod 156 and 141 have not been shown. The instrument of Figure 1 differs from the instrument 56 of my patent above identified in that no adjustment is provided for moving the aneroid capsule assembly 121 once it has been mounted to the bracket member. The equalizing altitude setting with the instrument shown in Figure 1 is accomplished through movement of the contacts 131 and 132 through rotation of the rod 136 and the gear train formed by the worm gear 139 and the sector gear meshing therewith.

Figure 4:
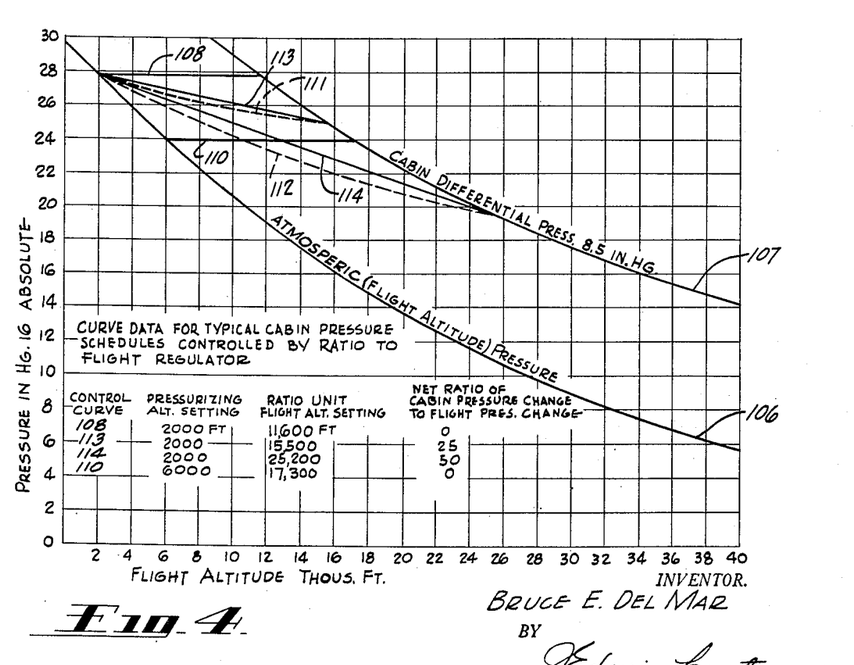
Figure 4 is a graphic plot of the pertinent pressure control relations between cabin pressure and flight altitude to more fully explain the present invention.

To more fully describe the control action of the instrument of the present invention, there is shown in Figure 4 graphic illustrations of pressure schedules controlled by the instrument of the present invention. The pressure of the standard atmosphere as a function of flight altitude is indicated by the curve 106 and so labeled. Flight altitude is scaled in thousands of feet abscissa and pressure is scaled in inches of mercury absolute along the ordinate of the graph. The control instrument of the present invention would be used with another instrument also operatively connected into the control system diagrammatically shown in Figure 1, to control operation of the motor and consequently the valve to prevent cabin differential pressure from exceeding some predetermined maximum differential determined by the structural strength of the cabin. For illustrative purposes there is shown in Figure 4 a curve 107 indicating the limit cabin differential pressure of 8.5 in. Hg with respect to the atmospheric pressure. This limit differential pressure is constant so that the vertical or ordinate distance between this curve and the atmospheric pressure curve is a constant fixed quantity for all flight altitudes.

The curve 108 of the graph of Figure 4 represents one possible control schedule with the instrument of the present invention. This curve represents a schedule of cabin pressure during transition of flight altitude from 2000 feet to 11,600 feet and for this schedule cabin pressure will remain constant at a value of 27.82 inches of mercury absolute during flight between these altitudes.

To bring about a cabin pressure control schedule such as represented by the curve 108, the instrument would be adjusted through rotation of the rod 136 to provide an equalizing altitude setting of 2000 feet. This adjustment, as should now be clear, would conjointly move contacts 131 and 132 upwardly, as viewed in Figure 1, to bring contact 132 into engagement with the control arm 129. As previously explained, engagement of contact 132 with the control arm 129 energizes the valve opening circuit of the motor 56. Under this cabin pressure control schedule the support element 147 would occupy the position shown in solid lines in Figure 1 and would not be operative to control movement of the arm 129.

With the instrument set as above described the aneroid capsule assembly 121, so long as the aircraft did not exceed an altitude of 2000 feet, would remain sufficiently collapsed to hold the control arm in engagement with contact 132. The valve would consequently remain open and cabin pressure would follow atmospheric pressure as the aircraft ascended. When the aircraft had ascended to an altitude of 2000 feet, the aneroid capsule assembly 121 would, in expanding because of lessening pressure, move the control arm 129 out of engagement with the contact 132. As the aircraft continued to ascend, the aneroid capsule assembly in further expanding would move control arm 129 into engagement with the contact 131, which, it will be remembered, completes the valve closing circuit of the motor.

As soon as the valve commenced its closing movement, cabin absolute pressure would increase which would bring about a collapsing action of the aneroid assembly to move the control arm out of engagement with contact 132. If cabin absolute pressure continued to increase, the control arm would be moved into engagement with contact 132 to energize the valve opening circuit of the motor 56. The control arm 129 would, therefore, under the control action of the aneroid assembly 121 act to effect operation of the valve such that cabin absolute pressure would be maintained at a simulated 2000 feet altitude as the aircraft continued to ascend.

It should now be obvious that if an apparent cabin altitude of say 6000 feet was desired to be maintained in the cabin, such as represented by the curve 110 in Figure 4, the instrument would be adjusted by manipulation of the rod 136 to set the contacts 131 and 132 in the position to bring about an equalizing altitude setting of 6000 feet. Here again the support element 147 would be maintained in the position shown in solid lines in Figure 1 to obviate any control action by the differential pressure capsule assembly 158 on the control arm 129.

Control of cabin pressure in accordance with a schedule along any one of a plurality of sloping curves such as control curves 111 and 112 can be presented by a fractional ratio. An ordinary ratio control would be represented by the following:

$$\frac{(P) - (\text{cabin absolute pressure})}{(P) - (\text{flight absolute pressure})} = k_1$$

where P is the flight absolute pressure at the pressure altitude at which pressurization of the cabin is to begin, and $k_1$ is a predetermined constant which, for example, may have a useful range from 0 to 0.6. In the latter case this would be equivalent to saying that the decrease in cabin pressure above a predetermined pressurizing altitude will be 0.6 times the decrease in flight altitude pressure above this same predetermined point.

If the instrument of the present invention were to consist of two coacting aneroid units, one sensitive to cabin pressure and one sensitive to flight pressure, then the above expression for the ratio control would be clearly applicable. However, since the instrument comprises an aneroid sensitive to cabin pressure and a differential pressure capsule exposed to the difference between cabin pressure and flight pressure, the above expression may be more clearly applied in the form:

$$\frac{(P) - (\text{cabin absolute pressure})}{(\text{Cabin absolute pressure}) - (\text{flight absolute pressure})} = k_2$$

where P is the flight absolute pressure at the pressure altitude at which pressurization of the cabin is to begin, and $k_2$ is a predetermined constant which for example may have a useful range from 0 to 1.5. The expression for $k_1$ and $k_2$ define identical schedules of cabin pressure in that they each represent a straight line when plotted on a graph of cabin pressure as one ordinate and flight pressure as the other ordinate.

In Figure 4, the form of cabin pressure control in which the change of cabin pressure is a direct ratio to the change of flight pressure is represented by the sloping curve 111 and 112. The sloping curves, although straight when plotted on a graph of cabin pressure as one ordinate and flight pressure as the other ordinate are not straight when plotted as in Figure 4, but are bent with a greater slope at lower altitudes than at higher altitudes due to the form of the coordinate plot of the abscissa and ordinate in Figure 4. The straight curves 113 and 114 in Figure 4, however, represent ratio to flight pressure control in which the change of cabin pressure is a direct ratio to the change in flight altitude and not flight pressure.

This control is a considerable improvement over the form of the control represented by sloping curves 111 and 112 since during the operation of the aircraft, climbs and descents are normally gauged by instruments which read in terms of altitude. Thus, for the greatest comfort to passengers, the change of cabin pressure should be controlled at a minimum rate in relation to the pressure altitude variation of the aircraft and not its flight pressure variation. This type of control can be best defined by its straight line relationship in Figure 4 but can also be expressed:

$$\frac{(P) - (\text{cabin absolute pressure})}{(\text{Flight altitude}) - (\text{pressurizing altitude})} = k_3$$

where P is the flight absolute pressure at the pressure altitude at which pressurization of the cabin is to begin, and $k_3$ is a predetermined constant. If pressures are expressed in inches of mercury and altitudes are expressed in thousands of feet, the useful range of this ratio $k_3$ is from 0 to about .00007.

The equations for $k_1$ and $k_2$ represent a ratio to flight pressure control which can be defined as a straight line on a graphic plot of cabin pressure as a function of flight pressure. The equation for $k_3$ represents a ratio to flight pressure control which can be defined as a straight line on a graphic plot of cabin pressure as a function of flight altitudes. Two other forms of ratio control are similar to the two previously mentioned but as should now be understood are far less desirable. These are, first, one which plots a straight line for cabin altitude varying as a function of flight altitude, and secondly, one which plots a straight line for cabin altitude varying as a function of flight pressure.

The straight curves 113 and 114 are then preferred control schedules to that shown by the sloping curves 111 and 112. However, since the fractional expression for the ratio $k_1$ in the sloping curves is simple to express, this general ratio notation will be used for the ratio to altitude curves. For example, as shown by the table in Figure 4, the simplified approximate value of the ratio for curve 113 is ¼ or .25. Its exact value would have to be expressed by $k_3$.

Control curve 113 represents a schedule of cabin pressure during transition of flight altitude from 2,000 feet to 15,500 feet and for this schedule, cabin pressure is seen to vary from a value of 27.82 inches of mercury absolute (2,000 feet altitude) to a value of 24.98 inches of mercury absolute (4,900 feet altitude) during flight from 2,000 feet to 15,500 feet.

To bring about a cabin pressure control schedule such as represented by the curve 113 in the graph of Figure 4, the knob carried by the rod 136 would be adjusted until the dial of the instrument read a pressurizing altitude of 2000 feet. This adjustment, as should now be clear, would conjointly move contacts 131 and 132 upwardly, as viewed in Figure 1, to bring contact 132 into engagement with the control arm 129. As previously explained, engagement of contact 132 with the control arm 129 energizes the valve opening circuit of the the motor 56. Through manipulation of the actuating knob 157 the support element 147 carrying the capsule assembly 158 would be moved to a position in which the differential pressure capsule assembly would be operative to oppose the action of the aneroid capsule assembly 121 and conjointly act therewith through the ratio mechanism to control movement of the control arm 129. As in the operation of the embodiment of the instrument 56 of my patent above identified, the hands of the instrument would be moved to indicate a limit flight altitude of 15,500 feet and a ratio limit cabin altitude of 4,900 feet.

With the instrument set as above described, the aneroid pressure capsule assembly 121, so long as the aircraft did not exceed an altitude of 2000 feet, would remain sufficiently collapsed to hold the control arm 129 in engagement with the contact 132. As the aircraft ascended to an altitude of 2000 feet the aneroid capsule assembly 121 would in expanding move the control arm 129 out of engagement with the contact 132. As the aircraft ascended beyond an altitude of 2000 feet, the aneroid capsule assembly in further expanding would move control arm 129 into engagement with the contact 131 which, it will be remembered, completes the valve closing circuit.

As soon as the valve 57 commences to move toward closed position, cabin absolute pressure will immediately tend to increase over flight absolute pressure and cabin differential capsule assembly 158 will contract and thus move the yoke 145 in a clockwise direction about the axes of the pins 146. This in turn produces clockwise movement of the U-shaped link 142 about the axis of the pin 143, as previously explained, to apply an upward thrust to the leftward end of the control arm 129 to move the control arm into engagement with the contact 132 and thus open the valve 57 to consequently decrease cabin absolute pressure.

Because of the geometrical and kinematical arrangement of the ratio mechanism, cabin absolute pressure will change as a straight line function indicated by the curve 113 as the pressure altitude of the aircraft increases to the altitude indicated by the ratio limit flight altitude hand, that is: 15,500 feet. Control of the valve, as the aircraft continues to ascend, would be under the control of a differential pressure mechanism forming a part of the system, but not herein shown or described.

Again it is not believed necessary to explain how the instrument is adjusted to set the same to bring about the pressure schedule represented by the curve 114. Any number of pressure schedules can be brought about merely by adjustment of the knobs carried by the rods 136 and 156. It is to be remembered, however, that the schedules possible with the instrument of the present invention would be always subject to the limiting action of the differential pressure limit control instrument which is at all times operative to limit cabin differential pressure to some selected value such as represented by curve 107 and determined by the structural strength of the cabin.

Figure 3:
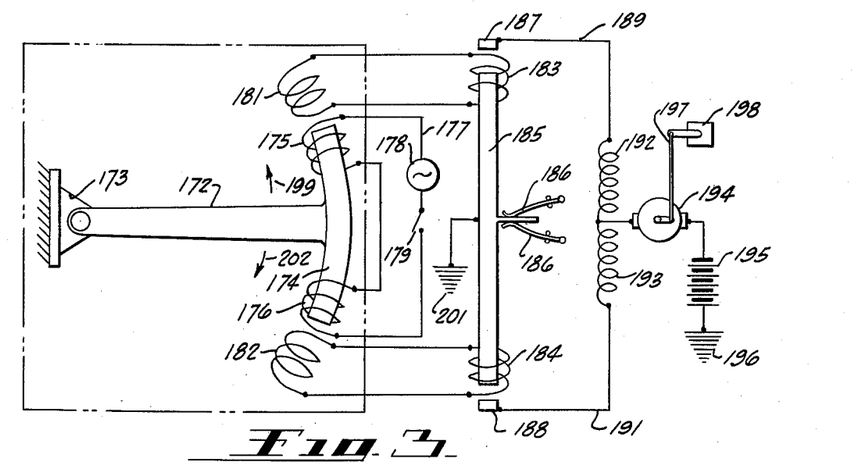
Figure 3 is a schematic showing of another embodiment of the present invention and showing the electrical circuits controlled thereby.

There is shown in Figure 3 an instrument schematically indicated at 171 which includes a control arm 172 pivotally mounted as indicated at 173. The embodiment of the instrument shown in Figure 3 includes an aneroid capsule assembly and differential pressure assembly, not shown, but which will coact through a ratio control mechanism of the form shown in Figure 1 to move the control arm 172 in opposite directions depending upon the relationship of cabin absolute pressure to flight pressure altitude.

The control arm 172 carries at its outer or free end a core element 174 arranged transversely of the arm 172. The opposite end portions of the core element 174 are coaxially disposed within space coils 175 and 176 series connected into a circuit 177 which includes a source of alternating current 178 and a manually operable switch 179. Arranged adjacent the coils 175 and 176 are coils 181 and 182 respectively, so formed that one or the other of the opposite end portions of the core element 174 will traverse the turns of one or the other of these coils as the arm 172 is pivotally moved in one direction or the other under the urgings of the pressure change responsive capsule assemblies interconnected with the arm 172. The coil 181 is series connected with a coil 183 while coil 182 is connected with a similar coil 184. The coils 183 and 184 circumscribe the opposite ends of a core element 185 mounted for longitudinal movement but yieldably held by centering springs 186, similar to springs 68 of the previously described control circuit, in a center or neutral position.

The normal position of the core element 185 is shown in Figure 3 and in this position the opposite end faces thereof are spaced from fixed contacts 187 and 188 connected respectively by leads 189 and 191 to field coils 192 and 193 of a reversible motor 194 similar to the motor 56 of the control systems of the previously described embodiments of the present invention. The circuit of the motor 194 includes a source of current such as the battery 195 grounded as indicated at 196.

The motor 194 drives, through a suitable gear and link mechanism indicated at 197, an air exhaust or discharge valve 198 regulating the rate of air discharge from the cabin. As the motor is reversible, depending upon the field coil energized, the motor will drive the valve in opposite directions to either increase or decrease the rate of air discharge from the cabin. Energization of the motor field coil 192 results in such rotational movement of the motor 194 as to move the valve 198 toward closed position while energization of the field coil 193 results in opening movement of the valve 198.

In the operation of the instrument now being described, if the arm 172 is moved in the direction of the arrow 199, the one end portion of the core element 174 progressively transverses the turns of the coil 181 to induce in that coil and consequently coil 183 an electro-magnetic flux sufficient to draw or attract the core 185 upwardly and into engagement with the contact 187. As the core 185 is grounded, as indicated at 201, movement of the core 185 into engagement with the contact 187 will complete a circuit from the battery 195 through the motor field coil 192 which, as previously explained, results in a closing movement of the valve 198.

On the other hand, if the arm 172 is moved in the direction of the arrow 202, the one end portion of the core element 174 moves between the turns of the coil 182 and the current induced in that coil and consequently the coil 184 will draw the core element 185 downwardly as viewed in Figure 3 and into engagement with the contact 188. It should now be obvious that engagement of the core element 185 with the contact 188 energizes the motor field coil 193 to produce opening movement of the valve 198.

It is not believed necessary to explain how the instrument of Figure 3 can be used to bring about the pressure schedules indicated by the curves 113 and 114 as actually this instrument will operate in exactly the same manner as the embodiment of the instrument shown in Figure 1. As the control action of that instrument has been explained in detail, it should be clear now how the instrument of Figure 3 will bring about the desired control of cabin absolute pressure.

Although all embodiments of the present invention have been herein shown and described as instruments controlling electrical systems, it should be obvious that by very slight modification the instruments herein shown could be used with other types of motivating systems. Hydraulic or pneumatic motivating systems could be used with the instruments of the present invention if such systems were preferred to the electrical ones herein illustrated.

Actually the particular type of system is not important to the instruments of the present invention and the electrical systems illustrated have been selected merely to further explain the control action possible with the instruments of the present invention. This is so, for it will be seen that the control arms in all embodiments illustrated are essentially actuators for controlling the motivating means regulating the operation of the device which in turn varies the rate of air discharge from the cabin, that is, actuates the discharge valve of the system.

Although the now preferred embodiments of the present invention have been illustrated and disclosed herein, it is to be understood that the invention is not to be limited thereto for it is susceptible to changes in form and detail within the scope of the appended claims.

I claim:

1. A pressure regulating device for use in a system for regulating absolute pressure within an aircraft cabin whereinto air is continuously supplied by an air delivery means and from which vitiated air is discharged through a controllable outlet valve, comprising: actuator means to be operatively connected to the control means for said valve; a first capsule responsive to changes in cabin absolute pressure; first link means, including a bell crank lever, operatively interconnecting said first capsule and said actuator means whereby said actuator means is moved in response to changes in cabin absolute pressure to regulate the valve control means to maintain cabin absolute pressure substantially constant above a preselected pressure altitude thereby to create a cabin differential pressure above said preselected pressure altitude; a second capsule responsive to changes in the differential between cabin absolute pressure and flight absolute pressure; means for pivotally supporting said second capsule whereby the direction of movement thereof as the same responds to changes in said differential may be varied; second link means operatively interconnecting said second capsule and said actuator means, said support means being movable to so position said second capsule that the latter, as cabin differential pressure changes, so moves said second link means as to oppose the action of said first capsule on said actuator means, said second link means being so arranged that in the said one position of said second capsule the incremental effect of such opposition progressively increases as the pressure altitude of the aircraft increases to so actuate said actuator means as to regulate the valve control means to decrease cabin absolute pressure in inverse straight-line proportion to increase in pressure altitude of the aircraft.

2. An instrument for use in a system for regulating pressure in an aircraft cabin, which system includes means to effect and control air outflow from the cabin comprising: a housing to be mounted within said cabin and including means for communicating the interior of said housing with the interior of said cabin; a rigid frame element removably mounted within said housing; an evacuated capsule mounted to said frame element, said capsule exteriorly subject to cabin absolute pressure, and movable in response to changes in cabin absolute pressure; a support element pivotally mounted to said frame element; a second capsule carried by said support element and movable therewith; means carried by said housing adapted to be connected to flight absolute pressure and communicating with the interior of said second capsule whereby the latter is to be subject to, and movable in response to changes in, the difference between cabin absolute pressure and flight absolute pressure; control effecting means, including means adapted to be operatively connected to the means of said system for effecting and controlling outflow of air from the cabin; means operatively connecting said first capsule to said control effecting means whereby the latter is motivated by pressure change responsive movements of said first capsule; a linkage mechanism interconnecting said second capsule and said control effecting means; means for pivotally moving said support element to vary the position of said second capsule relative to said linkage mechanism to thereby vary the operative connection between the said second capsule and said control effecting means, said linkage mechanism in one position of said second capsule opposing the action of said first capsule on said control effecting means and being so arranged that the incremental effect of said opposition progressively increases as the pressure altitude of the aircraft increases to produce such motivation of said control effecting means that the latter is adapted to control operation of said outflow effecting and controlling means of said system to vary cabin absolute pressure in inverse straight-line proportion to decrease in pressure altitude of the aircraft.

3. An instrument for use in a system for regulating pressure in an aircraft cabin, which system includes means to effect and control air outflow from the cabin comprising: a housing to be mounted within said cabin and including means for communicating the interior of said housing with the interior of said cabin; a rigid frame element removably mounted within said housing; an evacuated capsule mounted to said frame element, said capsule exteriorly subject to cabin absolute pressure, and movable in response to changes in cabin absolute pressure; a support element pivotally mounted to said frame element; a second capsule carried by said support element and movable therewith; means carried by said housing adapted to be connected to flight absolute pressure and communicating with the interior of said second capsule whereby the latter is to be subject to, and movable in response to changes in, the difference between cabin absolute pressure and flight absolute pressure; control effecting means, including means adapted to be operatively connected to the means of said system for effecting and controlling outflow of air from the cabin; means operatively connecting said first capsule to said control effecting means whereby the latter is motivated by pressure change responsive movements of said first capsule; and linkage mechanism, including link means pivotally mounted to said support element, operatively interposed between said second capsule and said control effecting means and operatively connected at the one end to said second capsule and so organized geometrically and kinematically within itself as to respond linearly and integratingly to the motions of both said capsules to progressively and decrementally modulate the response of said first capsule to changes in cabin absolute pressure as cabin differential pressure increases thereby to so motivate said control effecting means that the latter is adapted to control operation of said outflow effecting and controlling means of said system to constrain cabin absolute pressure to follow a straight line function of the pressure altitude of the aircraft.

4. An instrument for use in a system for regulating pressure in an aircraft cabin, which system includes means to effect and control air outflow from the cabin comprising: a housing to be mounted within said cabin and including means for communicating the interior of said housing with the interior of said cabin; a rigid frame element removably mounted within said housing; an evacuated capsule fixedly mounted to said frame element, exteriorly subject to cabin absolute pressure, and movable in response to changes in cabin absolute pressure; a support element pivotally mounted to said frame element; a second capsule carried by said support element and movable therewith; means carried by said housing adapted to be connected to flight absolute pressure and communicating with the interior of said second capsule whereby the latter is to be subject to and movable in response to changes in the difference between cabin absolute pressure and flight absolute pressure; a control arm; control means, including means adapted to be operatively connected to the means of said system for effecting and controlling outflow of air from the cabin, and operatively coacting with said arm to control operation of said outflow means; means operatively connecting said first capsule to said control arm whereby the latter is motivated by pressure change responsive movements of said first capsule; means for variably positioning said control means to vary the motivation of the same as said first capsule moves in response to changes in cabin absolute pressure; a linkage mechanism interconnecting said second capsule and said control effecting means; and means for pivotally moving said support element to vary the position of said second capsule relative to said linkage mechanism to thereby vary the operative connection by the said second capsule and said control effecting means, said linkage mechanism in one position of said second capsule opposing the action of said first capsule on said control effecting means and being so arranged that the incremental effect of said opposition progressively increases as the pressure altitude of the aircraft increases to produce such motivation of said control effecting means that the latter is adapted to control operation of said outflow effecting and controlling means of said system to vary cabin absolute pressure in inverse straight-line proportion to decrease in pressure altitude of the aircraft.

5. An instrument for use in a system for regulating pressure in an aircraft cabin, which system includes means to effect and control air outflow from the cabin comprising: a housing to be mounted within said cabin and including means for communicating the interior of said housing with the interior of said cabin; a rigid frame element removably mounted within said housing; an evacuated capsule mounted to said frame element, exteriorly subject to cabin absolute pressure, and movable in response to changes in cabin absolute pressure; a support element pivotally mounted to said frame element for arcuate movement thereon; a second capsule carried by said support element and movable therewith; means carried by said housing adapted to be connected to flight absolute pressure and communicating with the interior of said second capsule whereby the latter is to be subject to and movable in response to changes in the difference between cabin absolute pressure and flight absolute pressure; control effecting means, including means adapted to be operatively connected to the means of said system for effecting and controlling outflow of air from the cabin; means operatively connecting said first capsule to said control effecting means whereby the latter is motivated by pressure change responsive movements of said first capsule; a yoke; means pivotally connecting the free ends of said yoke to said support element; a pin carried between the legs of said yoke adjacent the transverse member thereof; a link pivotally interconnecting said second capsule and said pin; and a U-shaped link pivotally connecting the one end to said pin and at the opposite end to said control effecting means, said yoke and links forming a linkage mechanism so organized geometrically and kinematically within itself as to respond linearly and integratingly to the motions of both said capsules to progressively and decrementally modulate the responses of said first capsule to changes in cabin absolute pressure as cabin differential pressure increases thereby to so motivate said control effecting means that the latter is adapted to control operation of said outflow effecting and controlling means of said system to constrain cabin absolute pressure to follow a straight line function of the pressure altitude of the aircraft.

6. An instrument for use in a system for regulating pressure in an aircraft cabin, which system includes means to effect and control air outflow from the cabin comprising: a housing to be mounted within said cabin and including means for communicating the interior of said housing with the interior of said cabin; a rigid frame element removably mounted within said housing; an evacuated capsule fixedly mounted to said frame element, exteriorly subject to cabin absolute pressure, and movable in response to changes in cabin absolute pressure; a support element pivotally mounted to said frame element; a second capsule carried by said support element and movable therewith; means carried by said housing adapted to be connected to flight absolute pressure and communicating with the interior of said second capsule whereby the latter is to be subject to and movable in response to changes in the difference between cabin absolute pressure and flight absolute pressure; control effecting means, including means adapted to be operatively connected to the means of said system for effecting and controlling outflow of air from the cabin; means operatively connecting said first capsule to said control effecting means whereby the latter is motivated by pressure change responsive movements of said first capsule; means for adjusting said control effecting means to vary the motivation of the same as said first capsule moves in response to changes in cabin absolute pressure; a linkage mechanism interconnecting said second capsule and said control effecting means; and means for pivotally moving said support element to vary the position of said second capsule relative to said linkage mechanism to thereby vary the operative connection between said second capsule and said control effecting means, said linkage mechanism in one position of said second capsule opposing the action of said first capsule on said control effecting means and being so arranged that the incremental effect of said opposition progressively increases as the pressure altitude of the aircraft increases to produce such motivation of said control effecting means that the latter is adapted to control operation of said outflow effecting and controlling means of said system to vary cabin absolute pressure in inverse straight-line proportion to decrease in pressure altitude of the aircraft.

BRUCE E. DEL MAR.

References Cited in the file of this patent

UNITED STATES PATENTS

| Number | Name | Date |
|---|---|---|
| Re. 23,536 | Del Mar | Aug. 26, 1952 |
| 2,396,116 | Noxon | Mar. 5, 1946 |
| 2,450,076 | Bechberger | Sept. 28, 1948 |
| 2,463,487 | Widgery et al. | Mar. 1, 1949 |
| 2,549,673 | Del Mar | Apr. 17, 1951 |
| 2,549,690 | Klemperer | Apr. 17, 1951 |